United States Patent [19]

Schneider

[11] 4,016,934
[45] Apr. 12, 1977

[54] PACKER WHEEL CONSTRUCTION
[76] Inventor: Fred J. Schneider, P.O. Box 940, Eston, Saskatchewan, Canada
[22] Filed: July 28, 1975
[21] Appl. No.: 599,646
[52] U.S. Cl. .................................. 172/555; 172/548
[51] Int. Cl.² ........................................ A01B 21/04
[58] Field of Search .......... 172/548, 555, 557, 767, 172/537, 538, 540; 111/85

[56] References Cited
UNITED STATES PATENTS

| | | | |
|---|---|---|---|
| 204,988 | 6/1878 | McColm | 172/548 |
| 442,538 | 12/1890 | Parker | 172/548 |
| 835,371 | 11/1906 | Smith | 172/548 |
| 1,005,389 | 10/1911 | Wilberg | 172/548 |
| 1,064,265 | 6/1913 | Waterman | 172/548 X |
| 1,069,264 | 8/1913 | Keller | 172/548 X |
| 1,673,184 | 6/1928 | Cady | 172/548 X |
| 1,673,184 | 6/1928 | Cady | 172/557 |
| 2,228,389 | 1/1941 | Garey | 172/548 |
| 3,186,497 | 6/1965 | Forbes | 172/548 |
| 3,297,096 | 1/1967 | Wooldridge | 172/548 X |
| 3,539,015 | 11/1970 | Schlabs | 172/540 X |

FOREIGN PATENTS OR APPLICATIONS

| | | | |
|---|---|---|---|
| 624,302 | 7/1961 | Canada | 172/540 |
| 380,728 | 9/1923 | Germany | 172/548 |
| 26,539 | 4/1908 | Sweden | 172/548 |

Primary Examiner—Richard T. Stouffer
Attorney, Agent, or Firm—Stanley G. Ade

[57] ABSTRACT

Conventional land packer wheels used in conjunction with seed drills or the like tend to pulverize the soil and often become clogged with debris. The present device gives proper soil compaction and does not pulverize or clog due to the shape of the teeth which are of a tapered diamond formation. Also the teeth extend from both sides of a disc having a central hub which positions the discs one from the other correctly. The construction is also strong enough to support the weight of the implement.

1 Claim, 3 Drawing Figures

PACKER WHEEL CONSTRUCTION

BACKGROUND OF THE INVENTION

This invention relates to new and useful improvements in the construction of packer wheels used with agricultural implements. Although the wheels of the present invention are designed primarily for use in the seeding operation, nevertheless it will be appreciated that they can be used in any other environments.

Conventionally, packer wheels consist of a rim having lugs extending upon each side of the rim at the periphery thereof and these lugs are often flat or hollow or radially extending type lugs.

Most of the wheels in present use are spoked with a short or relatively narrow hub which has to be mounted with spacers to obtain the desired spacing of the wheels. Also, conventional lugs are light, flat or hollow when the lug is engaged with the ground thus allowing it to pick up dirt and carry it around with the wheel.

Furthermore, there is very little surface attachment to the lugs thus allowing breakage under adverse conditions and in the case of flat lugs, wind and soil erosion is encouraged because the lugs pulverize rather than pack.

SUMMARY OF THE INVENTION

The present invention overcomes all of these disadvantages by providing a disc type packer wheel having hubs which extend outwardly upon each side sufficient to automatically space the wheels one from the other when in use. Furthermore, the lugs are diamond-shaped and are set back from the periphery of the wheel which not only gives additional strength to the wheel and prevents pulverizing and clogging, but also prevents damage occurring from roadways when transporting the packer from one place to another.

The principal object and essence of the invention is therefore to provide a packer wheel of the character herewithin described which efficiently packs soil under the majority of conditions without breakage, pulverization or clogging occurring.

Another object of the invention is to provide a device of the character herewithin described in which the construction is relatively strong so that the wheels will not break under normal conditions and are able to carry a hitch for multiple implement hitches, neither will the lugs snap off from the surface of the disc forming the wheel.

A still further object of the invention is to provide a device of the character herewithin described in which the lugs are set back from the periphery of the wheel, the periphery being rounded so that undue damage does not occur to roadways during transportation.

Still another object of the invention is to provide a device of the character herewithin described which, due to width of the hubs, eliminates the necessity for spacers and the like.

A still further object of the invention is to provide a device of the character herewithin described which is simple in construction, economical in manufacture, and otherwise well suited to the purpose for which it is designed.

With the foregoing objects in view, and other such objects and advantages as will become apparent to those skilled in the art to which this invention relates as this specification proceeds, my invention consists essentially in the arrangement and construction of parts all as hereinafter more particularly described, reference being had to the accompanying drawings in which:

BRIEF DESCRIPTION OF THE DRAWINGS

In the drawings like characters of reference indicate corresponding parts in the different figures.

DETAILED DESCRIPTION

Figure 1:
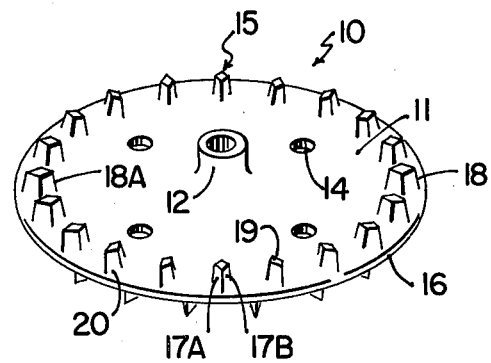
FIG. 1 is an isometric view of one the packer wheels.
Figure 2:
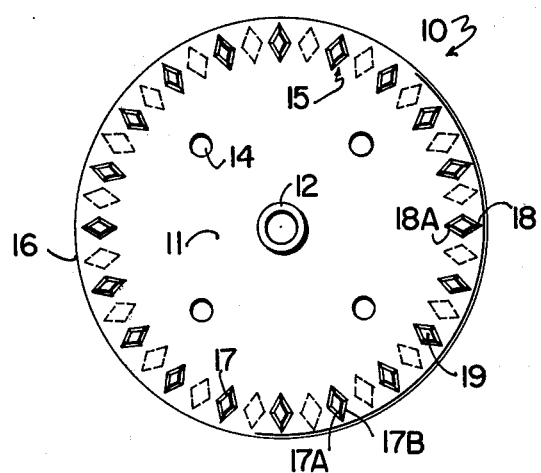
FIG. 2 is a front elevation of the wheel.

Proceeding therefore to describe the invention in detail, the packer wheel collectively designated 10 consists of a relatively heavy metal disc 11 having a centrally located hub 12 formed upon each side of the disc and extending outwardly therefrom as clearly illustrated. These hubs are hollow and act as bearings to mount the wheels 10 upon an associated axle shaft 13 and the width of the hubs automatically spaces the wheels in the correct relationship one from the other as clearly shown in FIG. 3, thus eliminating the necessity of spacers, washers or the like normally used.

The plurality of apertures 14 are formed through the surface of the disc thus facilitating the handling of the wheels in assembly inasmuch as they may be used for engagement of hooks, bars or the like, it being understood that these discs are relatively heavy.

Figure 3:
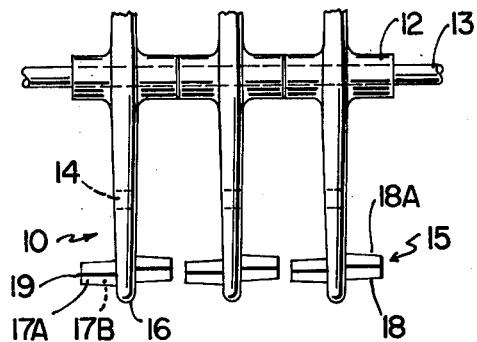
FIG. 3 is a fragmentary side elevation of a plurality of wheels in side-by-side relationship.

Formed integrally with the disc 11 and extending outwardly upon each side thereof is a plurality of lugs collectively designed 15 and these lugs are situated spaced inwardly from the periphery 16 of the disc as clearly illustrated. This periphery 16 is rounded as illustrated in FIG. 3 when viewed in end or side elevation and this prevents undue damage occurring when the packer is moved from one location to the other along conventional roadways. With conventional packer wheels, the teeth or lugs are normally at the periphery which causes considerable damage to roadway surfaces.

Although the lugs or teeth are the same radial distance from the axis of the disc, nevertheless the lugs on one side of the disc are staggered circumferentially relative to the lugs on the other side of the disc and this is shown clearly in FIG. 1.

Each lug or tooth 15 is in the form of a frustum of a pyramid and in this particular embodiment illustrated and described, the pyramid is four-sided, reference character 17 illustrating the sides and reference character 18 illustrating the apex between two of the outermost sides and it will be observed that this particular apex 18 is directed radially outwardly relative to the axis of the disc so that this apex engages the ground as the disc rotates with the two immediately adjacent sides 17A and 17B thus making a triangular indentation. In other words, two of the opposing apices or edges between adjacent sides of the lugs lie on a radial line of the disc with the other two lying substantially parallel to the perimeter of the disc but spaced inwardly therefrom.

The fact that the lugs increase in cross sectional area from the outer surface 19 of the lugs towards the attaching portion 20, gives additional strength to the lugs and prevents breakage from occurring during use.

The pyramidal configuration of the lugs 15 also gives better penetration and mulching of relatively large lumps or clods of soil and this tapering action also assists in clearing hard lumps, stones, etc., which might lodge between the lugs and/or adjacent wheels. Furthermore, when the lugs are at the lowermost point of travel, the opposite apex 18A is uppermost which assists in shedding soil and preventing same from being carried around or following the wheels as they rotate. With the orientation of the lugs as described, sharply defined depressions or water dams are formed in the soil surface even when said surface is relatively dry and hard.

The use of these relatively heavy duty wheels assists in heavy duty mulching, assists in damming and compaction in order to save moisture and improve crop germination and the like and they also condition the soil for safer harvesting operations, inasmuch as small stones, roots or the like will be embedded in the soil thus preventing them from being picked up by harvesting equipment.

Furthermore, the strength and weight of the wheels makes it possible to utilize multiple hitches on the wheels thereby combining two or more implements, inasmuch as the wheels are strong enough to support the implements.

The staggered relationship of the lugs together with the weight of the wheels leaves impressions or small dams in the soil in a pattern that will trap rainfall and prevent runoff and erosion in heavy showers and as mentioned previously, the wheels are heavy and strong enough to press small stones, roots, etc., into the soil to prevent pick-up by harvesting equipment.

It will also be appreciated that the wheels can be mounted upon the axle 13 in a sufficient number to give the desired width of coverage and they can be adapted for use with press drills, cultivators, harrows, and the like.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A packer wheel for use with agricultural implements comprising a disc, a central hub formed on said disc and extending outwardly on each side thereof for supporting said wheel for rotation upon an associated supporting axle, and a plurality of packer lugs formed adjacent to but spaced inwardly from the periphery of said disc and extending outwardly upon each side of said disc, each of said lugs having four sides with each side inclined away from the center of said lug from the other end of said lug toward the inner end thereof thus giving additional strength of said lugs at the junction between said lugs and said disc, the outer ends of said lugs being flattened thus forming a frustum of a four sided pyramid, adjacent ones of said four sides of each of said lugs meeting to form relatively sharply defined edges, two of the opposing edges of each of said lugs lying on a radial line extending from the center of said hub to the periphery of said disc, the other two opposing edges of each of said lugs lying on a circular line parallel to and spaced inwardly from the outer periphery of said disc, said periphery of said disc being rounded when viewed in cross section, said hubs extending outwardly from said disc a distance slightly more than the distance that said lugs extend outwardly, said lugs on both sides of said disc being substantially the same distance from the axis of said disc, but the lugs on one side of said disc being staggered circumferentially relative to the lugs on the other side of said disc.

* * * * *